United States Patent
Whitehouse

(10) Patent No.: US 7,484,048 B2
(45) Date of Patent: Jan. 27, 2009

(54) CONDITIONAL MESSAGE DELIVERY TO HOLDER OF LOCKS RELATING TO A DISTRIBUTED LOCKING MANAGER

(75) Inventor: Steven John Whitehouse, Swansea (GB)

(73) Assignee: Red Hat, Inc., Raleigh, NC (US)

( * ) Notice: Subject to any disclaimer, the term of this patent is extended or adjusted under 35 U.S.C. 154(b) by 316 days.

(21) Appl. No.: 11/115,688

(22) Filed: Apr. 27, 2005

(65) Prior Publication Data

US 2006/0248127 A1    Nov. 2, 2006

(51) Int. Cl.
G06F 13/00    (2006.01)

(52) U.S. Cl. .................................. 711/152; 711/150
(58) Field of Classification Search .................. None
See application file for complete search history.

(56) References Cited

U.S. PATENT DOCUMENTS

| | | | |
|---|---|---|---|
| 5,553,239 A | 9/1996 | Heath et al. | |
| 5,596,754 A * | 1/1997 | Lomet | 710/200 |
| 5,828,876 A | 10/1998 | Fish et al. | |
| 6,493,804 B1 | 12/2002 | Soltis et al. | |
| 6,697,901 B1 * | 2/2004 | Shun Chan | 710/200 |
| 7,200,623 B2 * | 4/2007 | Chandrasekaran et al. | 707/203 |
| 2003/0027487 A1 | 2/2003 | Haug | |
| 2003/0227487 A1 * | 12/2003 | Hugh | 345/777 |

OTHER PUBLICATIONS

Adams, Steve. Oct. 1999. *Oracle8i Internal Services: for Waits, Latches, Locks, and Memory.* O'Reilly & Associates, Inc. Sebastopool, California.
Shah, Jay. 1991. "VAXclusters and Other High-Availability Systems." *VAXclusters: Architecture, Programming and Management.* McGraw-Hill, Inc. p. 57-99.
Kenah, Lawrence J. et al. 1984. "VAX/VMS Lock Manager." *VAX/VMS Internals and Data Structures.* Digital Press. p. 244-263.
http://redhat.com/whitepapers/rha/gfs/GFS_INS0032US.pdf, 2004.
http://lse.spurceforge.net/io/aio.html, 2005.
Schimmel, Curt. "UNIX Systems for Modern Architectures." Addison Wesley, ISBN 020163388, 1994.
Drepper, Ulrich. Dec. 13, 2004. "Futexes are Tricky." http://people.redhat.com/drepper/futex.pdf.
International Search Report and Written Opinion issued for PCT/US06/15959, dated Mar. 14, 2008.

* cited by examiner

*Primary Examiner*—Reginald G. Bragdon
*Assistant Examiner*—Thanh D Vo
(74) *Attorney, Agent, or Firm*—Wilmer Cutler Pickering Hale and Dorr LLP

(57) ABSTRACT

A method of and system for managing storage resources in a distributed file system is described. A lock for a storage resource is maintained on a lock-holding node. A master node that controls the lock-holding node receives a lock request from a requesting node. The lock request includes a request to obtain a lock for the storage resource, and a request to perform an action by the lock-holding node on the storage resource if the request to obtain the lock is not granted immediately.

21 Claims, 7 Drawing Sheets

FIG. 3.

Resource Directory

| Resource | Lock Mastering Node | |
|---|---|---|
| Disk A Block L | Node 1 | ⟋301 |
| Disk A Block N | Node 1 | ⟋303 |
| ⋮ | ⋮ | |
| Disk C Block M | Node P | ⟋305 |

FIG. 7

| The frequency of the lock-holding node using the resource | The amount of I/O needed to release the lock | The cost of performing the requested action | Decision |
|---|---|---|---|
| High | High | Low | No |
| Low | Low | High | Yes |

701 (first data row), 703 (second data row)

US 7,484,048 B2

CONDITIONAL MESSAGE DELIVERY TO HOLDER OF LOCKS RELATING TO A DISTRIBUTED LOCKING MANAGER

FIELD OF THE INVENTION

This invention relates to improving a distributed locking manager in a clustered network in order to enhance the efficiency of software applications that use the distributed locking manager.

BACKGROUND OF THE INVENTION

Modern computers are often networked together and share resources such as storage resources (e.g., disks). By sharing storage resources, each networked computer can store data on any storage resource of the network. One way to network computers is to cluster them, which forms a clustered network of nodes (i.e., computers). An example of clustered networks is described in "Chapter 3: VAX Clusters and Other High-Availability Systems", *VAXclusters Architecture. Programming and Management*, Shah, McGraw-Hill, Inc., 1991.

In networked computers, a system of protocol (called a file system) manages and controls accesses to storage resources (e.g., writing or retrieving data) to preserve the integrity of stored data. An example file system is a cluster file system, used in clustered networks, to write and retrieve data. One feature of a cluster file system is that each node makes direct accesses to storage resources. In other words, no one node functions as a server responsible for managing storage resources, and each node views all storage resources as essentially locally accessible resources. A cluster file system typically includes a distributed lock manager (DLM) for coordinating file system accesses among nodes. Example conventional DLMs are described in "Chapter 13: VAX/VMS Lock Manager," *VAX/VMS Internals and Data Structures*, Kenah et al., Digital Press, 1984 and Chapters 4 and 5 of *Oracle 8i Internal Services for Waits, Latches, Locks and Memory*, O'Reilly & Associates.

In a conventional DLM, for a node (the "lock-requesting node") to access a particular storage resource, the node first determines if another node holds a lock for the same storage resource (the "lock-holding node"). If there is a lock-holding node for the storage resource, then the lock-requesting node sends a request to the lock-holding node to access the storage resource.

Upon receiving the request, the lock-holding node completes its task (if any) of accessing the storage resource and releases the lock. For instance, if the lock-holding node is writing a block of data to the storage resource at the time the request is received, the lock-holding node must complete that task. Subsequently, the lock is released and transferred to the lock-requesting node. These steps cause the conventional DLM to incur some administrative costs, which include, for example, flushing the cache memory and/or the journal of the lock-holding node. The latter example entails, e.g., performing operations and their dependent operations required by the journal, and writing success markers for the required operations after performing them.

The conventional DLM performs steps of releasing and transferring locks, thereby incurring the administrative costs, even if the lock-holding node would need to access the storage resource soon after the lock is transferred to the lock-requesting node. These steps are also performed even if the lock-requesting node plans to write only a small amount of data on the storage resource. Hence, the conventional DLM is inefficient because, among other things, it may require a lock-holding node to release its lock without considering whether the lock-holding node would request the lock soon after releasing it or whether only a small amount of data would be written by a lock-requesting node.

SUMMARY OF THE INVENTION

Embodiments of the present invention reduce the number of release and transfer lock operations in a DLM, thereby minimizing the administrative costs. This feature, in combination with other features, increases the efficiency of software applications that use the DLM of the present invention. By reducing the number of times locks are released and transferred between various nodes, file systems implemented according to the present invention become more efficient than file systems that use a conventional DLM.

In particular, embodiments of the present invention include a method of managing storage resources in a distributed file system. The method includes a) maintaining a first lock for a storage resource using a lock-holder and b) receiving, at a master node that manages the lock-holder, a lock request from a requesting node. The lock request includes a request to obtain a second lock for the storage resource, and a request for a node on which the lock-holder resides to perform an action on the storage resource. The master node sends a message to the lock-holder instructing it to either release the lock or perform the action. Upon receiving the message, the lock-holder determines, using an algorithm, whether to release the first lock or to perform the action based on, for example, the cost of performing the requested action and the cost of releasing the first lock. If the cost of releasing the lock is higher than the cost of performing the requested action, then the lock is not released, and vice versa. By not releasing the first lock in certain instances, the administrative costs associated with releasing the lock are reduced.

BRIEF DESCRIPTION OF THE DRAWINGS

For a better understanding of embodiments of the present invention reference will be made, by way of example, to the accompanying drawings:

FIG. 3 is a table illustrating an example resource directory for embodiments of the present invention;

FIG. 7 is a table illustrating a relationship between various inputs and an output of a decision algorithm implemented according to the present invention.

DETAILED DESCRIPTION OF EMBODIMENTS OF THE PRESENT INVENTION

Figure 1:
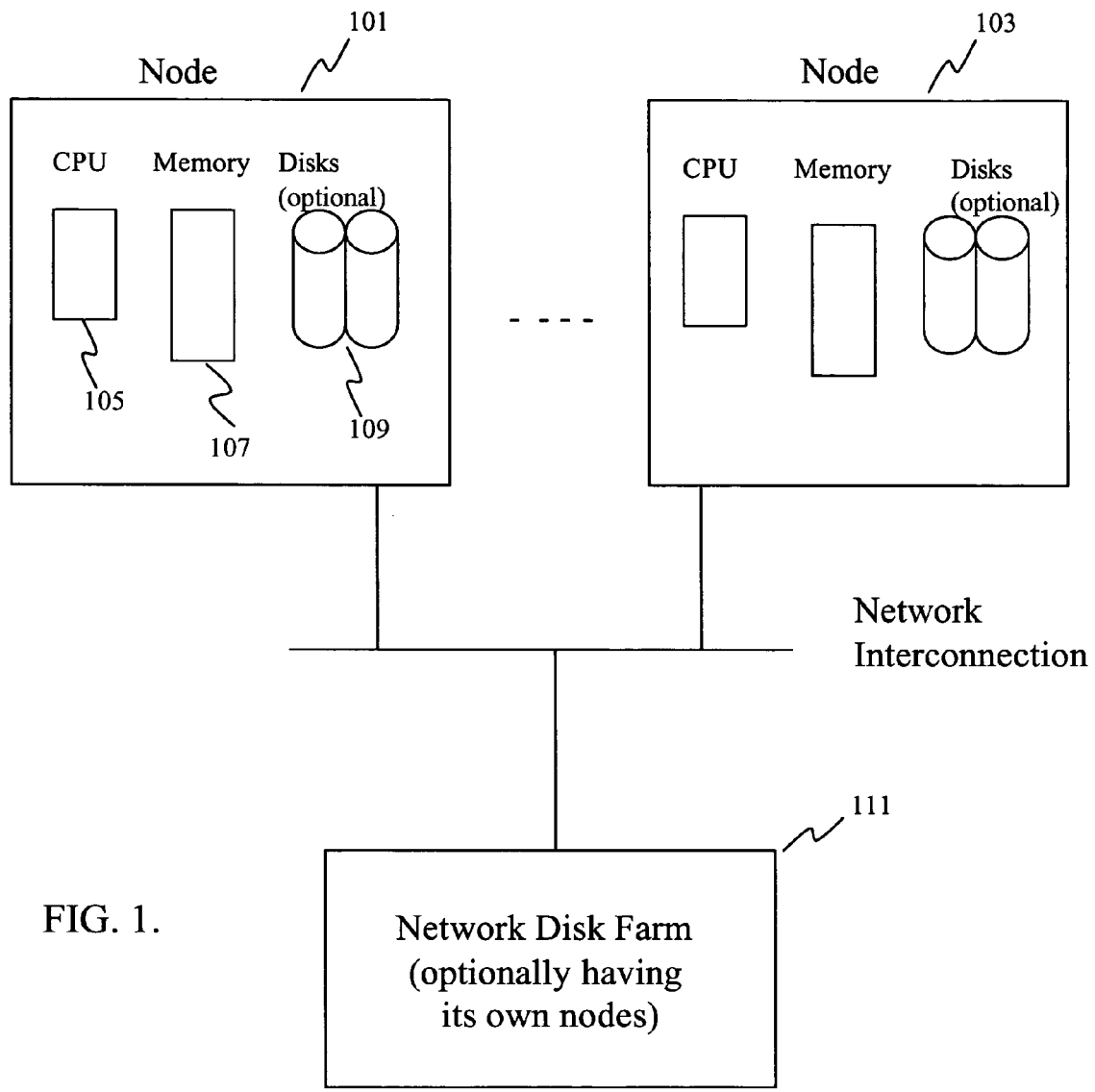
FIG. 1 is a block diagram that illustrates an example network on which embodiments of the present invention may be implemented.

The present invention improves the efficiency of software applications that use distributed locking managers (DLMs). Before describing various features of the DLM of the present invention, example hardware architecture on which embodiments of the present invention may operate is described in connection with FIG. 1. In a clustered network, as shown in FIG. 1, a number of nodes 101, 103 are connected without a server. An example of a node is a conventional computer. As a convention computer, a node includes a processor (CPU) 105 for processing instructions and data. A node may also include a main memory 107, such as a random access memory (RAM) or other dynamic storage resources, for storing data and instructions to be executed by the processor 105. A node can also include a read only memory (ROM) or other static storage resources for storing static data and instructions for the processor. An optional storage resource 109, such as a magnetic disk or optical disk, can be provided for storing data and instructions. A node may also include a number of peripheral devices such as a display monitor, input devices (e.g., a keyboard), and other input/output devices.

A node may also include an external communication interface. The external communication interface provides a two-way data communication coupling to a network link that is connected to, e.g., the cluster. For example, the communication interface can be an Ethernet connection, Cable or Digital Subscriber Line (DSL) card, a modem, or a wireless network interface card to provide a data communication connection to a corresponding type of telephone line.

The nodes 101, 103 can be configured identical to each other. Alternatively, the nodes can be configured differently. For instance, one node may include only one processor, while another node may include multiple processors.

Example embodiments of the present invention may also include a network disk farm 111, which may include its own nodes. The network disk farm is then connected to the network of the nodes via a communication link, for example, Ethernet or Firewire.

Figure 2:
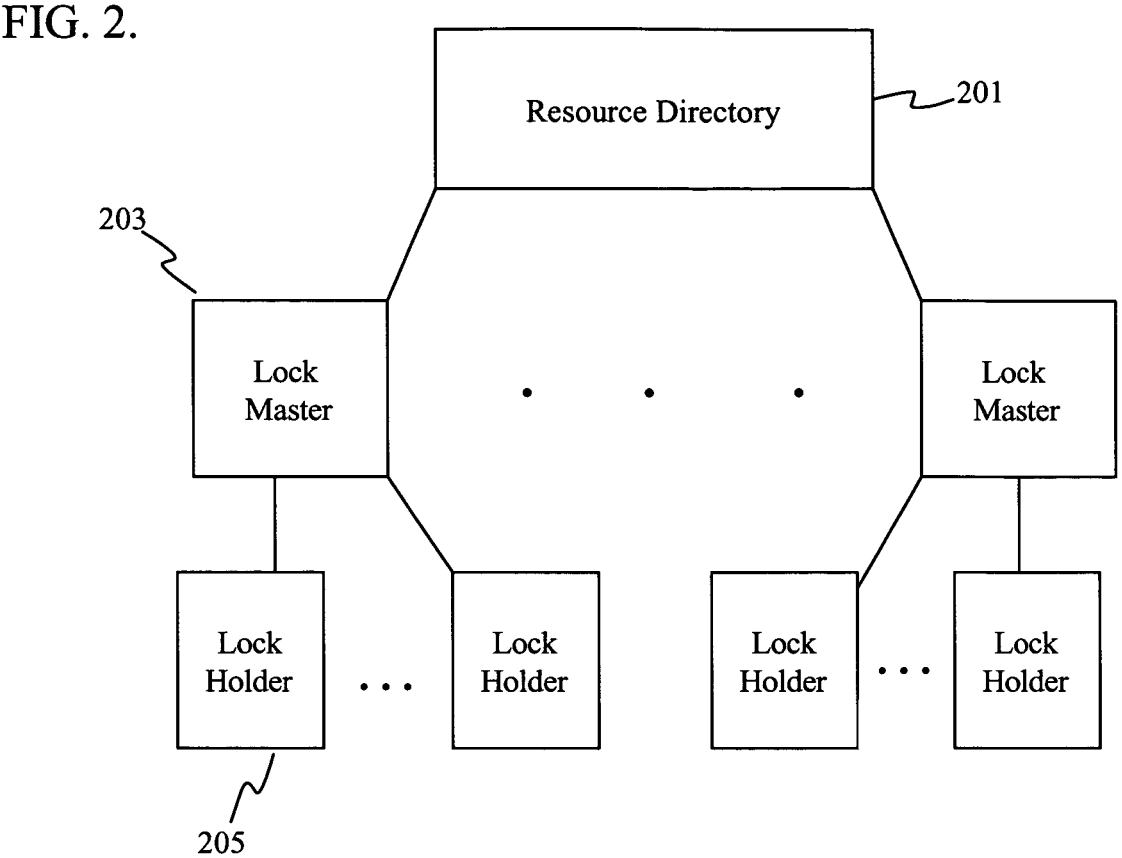
FIG. 2 is a block diagram that illustrates an example set of software components for implementing embodiments of the present invention.

FIG. 2 illustrates an example software architecture of the present invention. Embodiments of the present invention execute a set of software programs on the clustered network described above in connection with FIG. 1. The software programs can be collectively referred to as a distributed lock manager (DLM). Among other components, the DLM includes a resource directory 201 and locking mechanisms. The resource directory maintains a list of resources and other information. The locking mechanisms control allocation and modification of various locks on the resources. The lock mechanisms include, for example, one or more lock-masters 203 and one or more lock-holders 205.

FIG. 2 diagrammatically illustrates an example relationship between a resource directory and lock-masters. In particular, the resource directory contains information on which lock-master is managing which sub-set of resources. A lock-master, also known as a resource master, is a software component that makes decisions about which node is to hold the lock (the "lock-holder") on storage resource(s) that the lock-master manages. The node on which a lock-master runs is referred to as a lock-master node. The DLM can designate the node that most frequently uses a certain resource to be the lock-master node of that resource. One lock-master can manage all resources or a subset of them.

A lock-holder, being managed by a lock-master, is a software component that controls a lock for a particular storage resource(s) (e.g., one or more disk blocks). For each disk being activated (e.g., a disk that is being accessed to read/write data), a lock-holder is provided. The node on which a lock-holder runs is referred to as a lock-holding node. Processes running on a lock-holding node may access the storage resource locked by the lock-holder. For the purposes of describing embodiments of the present invention, a node might be described as performing actions when in fact it is a process (or processes) on the node that performs actions. For instance, "a lock-requesting node sending a request" means a process that runs on the lock-requesting node sends the request.

A lock, a software component, controls accesses to storage resources. Various types of locks allow different levels of access. Example types of locks are: a null lock, a concurrent read lock, a concurrent write lock, a protected read lock, a protected write lock, and an exclusive access lock. A null lock allows no access to the storage resource by the lock-holding node. A concurrent read lock or a concurrent write lock allows the lock-holding node to concurrently read or write, respectively, with other nodes. An exclusive lock allows the lock-holding node to exclusively read from and write to the storage resource. Embodiments of the present invention can include all of the above, subsets of the above, or additional lock types. Regardless which set of locks is included, locks can be granted adhering to mutual exclusion requirements, which dictate that, for example, if the lock for a resource is an exclusive lock, then no other node can access that resource, while if the lock for a resource is a concurrent read lock, then other nodes can read data from that resource by requesting concurrent read locks.

Lock-masters and lock-holders may reside on any combination of nodes. For instance, a lock-master can reside on one node while the lock-holders that are managed by the lock-master can reside on the same or different node. Moreover, any number of lock-masters and lock-holders can reside on one node or any combination of nodes. Lock-masters and lock-holders can also migrate from one node to another depending on the processing powers and/or usage of any particular set of nodes. In addition, a lock-holder can reside on one node while the storage resource locked by the lock-holder can reside on a same or different node.

An example resource directory is illustrated in FIG. 3. A lock-master running on Node 1 manages the lock holders for Disk A, Block L and Disk A, Block N (rows 301 and 303). The resource directory of FIG. 3 also illustrates that a lock-master running on Node P manages the lock holder for Disk C, Block M (row 305). As illustrated, an arbitrary number of lock-masters can co-exist on a cluster, and each lock-master can manage an arbitrary number of lock-holders. Although the resource directory shown in FIG. 3 uses a simple table, other known methods (e.g., using a database management system) can also be used in embodiments of the present invention to track lock-masters and their corresponding storage resources.

Using the example hardware and software architecture described above, an example operation of the present invention is described. When a process running on a node needs to access a storage resource, a request is made to the DLM. Here, the node from which the request originates is referred to a lock-requesting node. More than one node can send requests. Using a resource directory, lock-masters, and lock-holders, the DLM manages the requests received from lock-requesting nodes, ensuring compatibility of access rights to storage resources. For example, the DLM grants requests for accessing certain storage resources (e.g., disk blocks) and commands the corresponding lock-masters to manage the access rights granted in accordance with the mutual exclusion requirements of the requests. The DLM also causes requests for access rights that cannot be granted immediately to be either rejected or queued until they can be granted (e.g., at the option of the lock-holder or lock-master). The DLM tracks requests for storage resources that are currently locked. Subsequently, the DLM grants access rights when the storage resource does become available.

Figure 4:
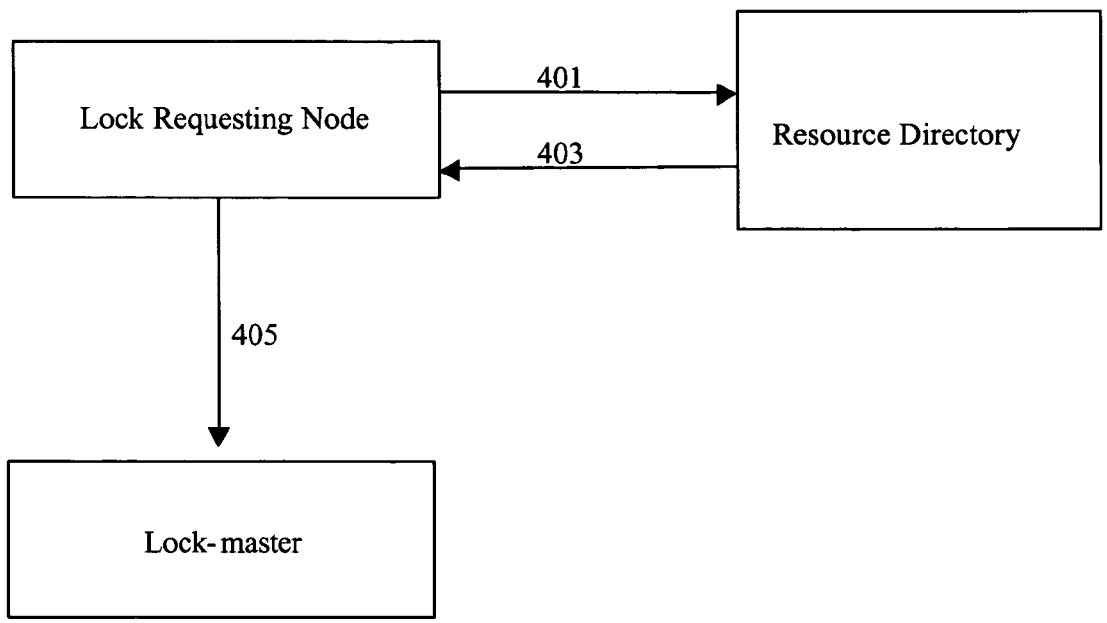
FIG. 4 is a part schematic and part flow chart diagram illustrating an example relationship between various software components of embodiments of the present invention.
Figure 5:
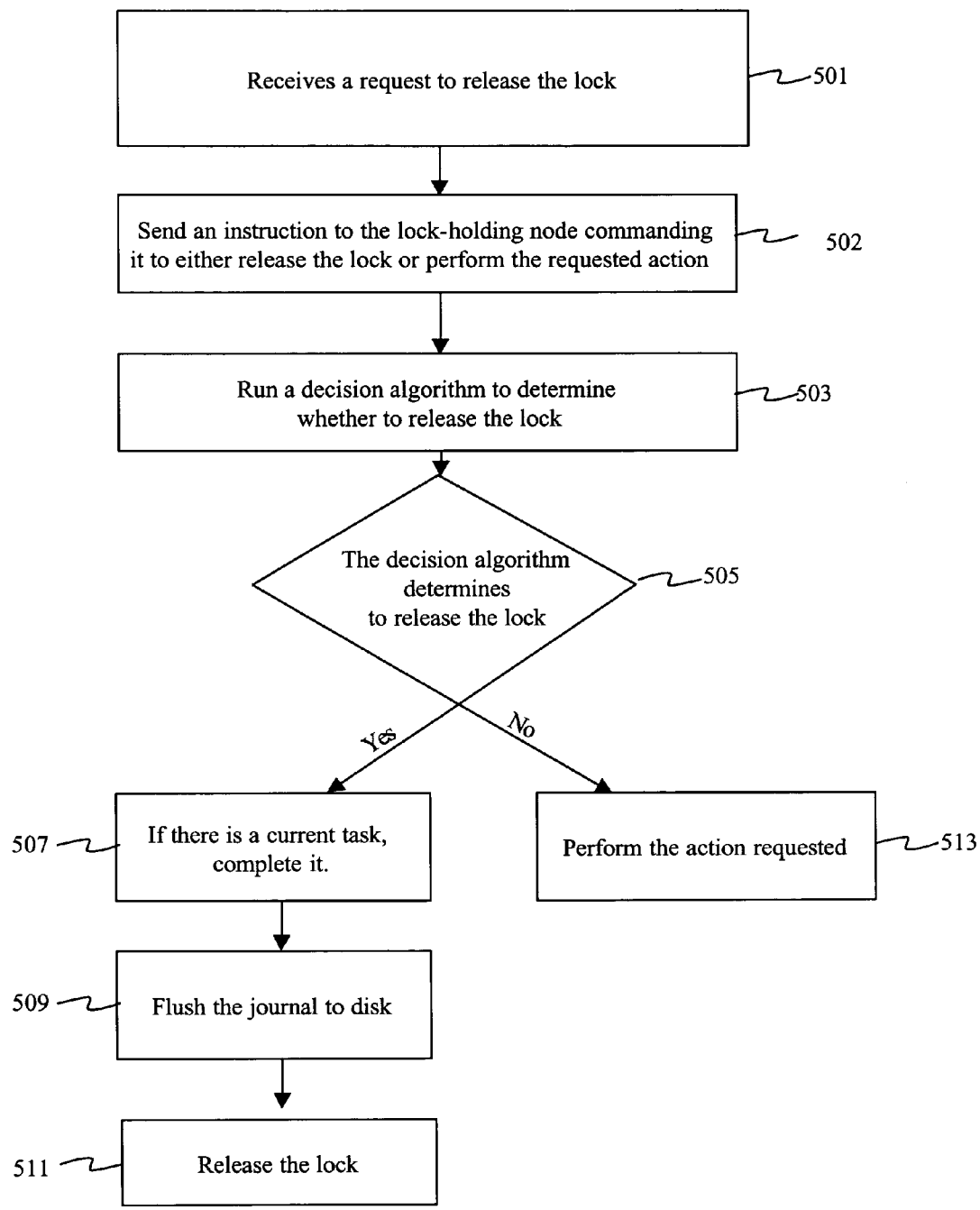
FIG. 5 is a flow chart diagram illustrating various steps that may be performed by embodiments of the present invention.

FIGS. 4 and 5 illustrate a more detailed example procedure in accessing a storage resource. Initially, a lock-requesting node accesses a resource directory in order to determine which node is the lock-master for the storage resource (steps 401 and 403). The lock-requesting node then sends a request to access the storage resource to the lock-master (step 405). The request includes at least two pieces of information: the type of the lock (e.g., read, write, or read-write lock) to be granted to the lock-requesting node, and an action to be performed if the lock cannot be granted immediately. The action mentioned here is different from the process of releasing and transferring the lock (i.e., granting the lock to the lock-requesting node). An example of the action to be performed is storing certain data on the storage resource by the lock-holding node on behalf of the lock-requesting node. The data can also be transmitted from the lock-requesting node to the lock-master as part of the request. In certain embodiments of the present invention, the size of the data to be transmitted as part of the request can be limited to a certain size (e.g., two or three times the size of the request without the data). This limitation can be imposed to reduce the load on the network bandwidth.

As shown in FIG. 5, the lock-master node receives the request (step 501). Upon receiving the lock request, the lock-master node sends a message to the lock-holding node instructing it to either release the lock or perform the requested action (step 502). The lock-holding node runs, among other things, a decision algorithm to determine whether to release the lock (step 503) or to perform the requested action. Alternatively, the lock-master node can run the decision algorithm and then instruct the lock-holding node based on the decision made by the algorithm.

One example decision algorithm compares the cost of releasing the lock and the cost of performing the action. The cost of releasing the lock may include, for example, the administrative cost of flushing the cache and journal before releasing the lock, completing the current task (e.g., an ongoing task of writing data to a storage resource), and re-transferring the lock from the lock-requesting node back to the current lock-holding node, if requested later. The cost of performing the requested action may include transferring the data to be written, thereby increasing the network traffic. Based on the comparison, the algorithm either commands the lock-holder to release the lock or to perform the requested action without releasing the lock (step 505). More specifically, if the cost of releasing the lock is greater than the cost of performing the action, the algorithm commands the lock holder to perform the action (step 513). In this case, the lock-holding node maintains the lock. If the cost of releasing the lock is less expensive than the cost of performing the requested action, the algorithm commands the lock holder to complete current tasks (if any) (step 507), flush the journal to disk (step 509) and flush the cache, and release the lock (step 511). Subsequently, the DLM transfers the lock to the requesting node and updates the resource directory.

Figure 6:
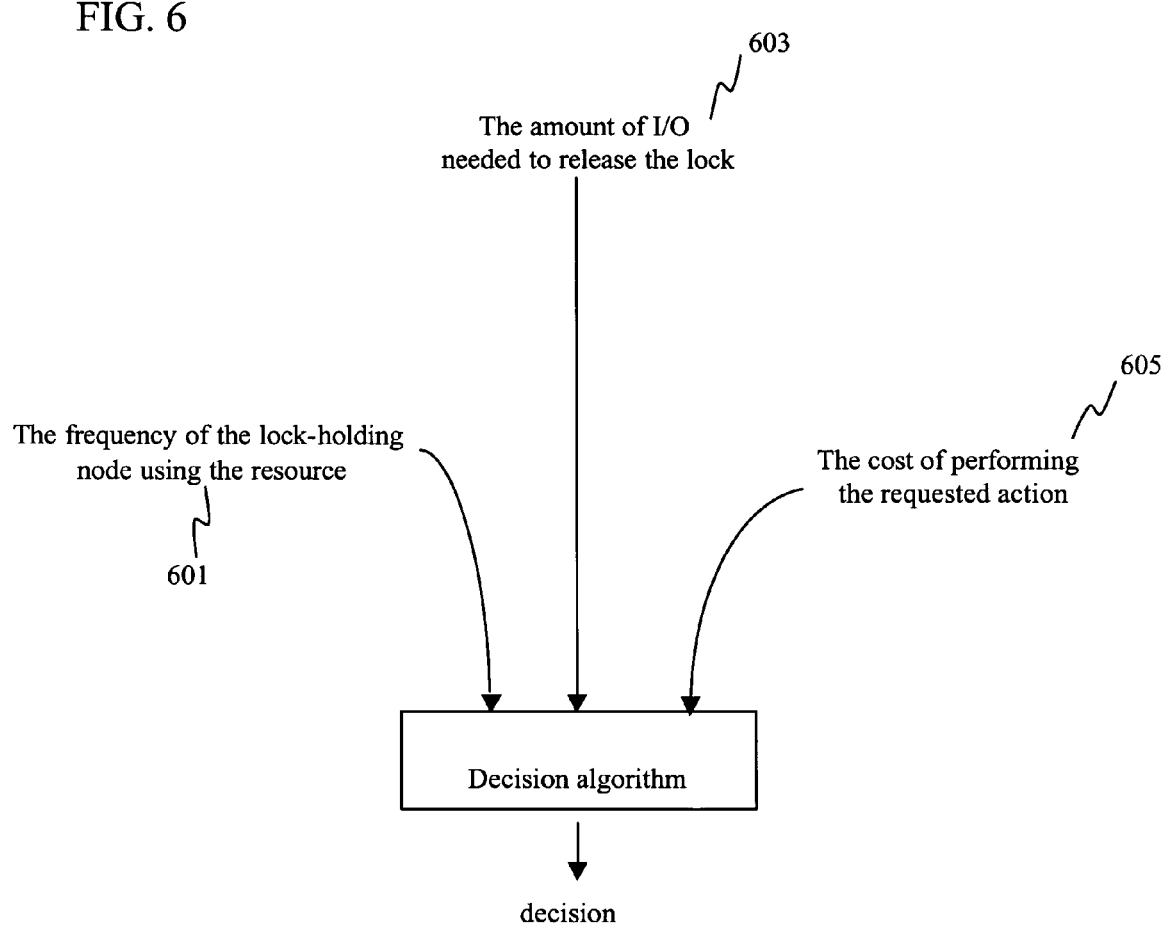
FIG. 6 is a flow chart diagram illustrating input/output of a decision algorithm implemented according to embodiments of the present invention.

Another example decision algorithm is shown in FIG. 6. This decision algorithm makes its decision based on, among other information, the frequency of the lock-holding node accessing the storage resource 601, the amount of I/O needed to release the lock 603, and the cost of performing the requested action 605. As shown in FIG. 7, the decision algorithm determines not to release the lock under one combination of factors (the "first combination"): i) the frequency of the lock-holding node using the storage resource is high; ii) the amount of input/output needed to released the lock is high; and iii) the cost of performing the requested action is low (row 701). Also, the decision algorithm determines to release the lock under another combination of factors (the "second combination"): i) the frequency of the lock-holding node using the storage resource is low; ii) the amount of input/output needed to released the lock is low; and iii) the cost of performing the requested action is high (row 703). The above-described combinations represent two extreme examples. For other combinations that fall between the two examples above, the algorithm makes decisions to achieve the goal of improving the efficiency of the overall cluster over time. As with the example shown in FIG. 5, after the decision is made, the lock is either released by or maintained at the lock-holding node (see steps 507-511).

The above-described algorithms are provided as examples. Moreover, the performance of the cluster is not required to be improved by each and every decision made by the decision algorithm as long as the performance is improved over time and for the entire cluster.

The above-described DLM is further described below using examples. The first example relates to "nodes" (used in a file system), which provide certain information regarding files, e.g., user and group ownership, access mode (e.g., read, write, execute permissions) and type of files. To open a new file, a file system creates a corresponding inode. Inodes are typically stored on a storage resource of a single node, which updates the inodes (the "updating node"). In order to access the information (e.g., obtaining the status of an inode), an instruction called stat(2) can be used. In a conventional cluster file system, when a third node (the "requesting node") attempts to run stat(2), the requesting node sends a request to the updating node asking it to release the lock for the storage resource on which the inode information is stored. In response, the updating node must flush its journal and release the lock. The lock is then transferred to the requesting node. When yet another node attempts to run stat(2), the above-described steps (e.g., sending a request and releasing the lock) are repeated and the lock is transferred to the last requesting node. When many nodes attempt to run stat(2), each node makes a request for the lock. These requests cause the lock for the storage resource for the inodes be released from and transferred to one node to another. This introduces inefficiencies because each time the lock is released and transferred, for example, the journal of the releasing node needs to be flushed.

In this example, the decision algorithm of embodiments of the present invention determines that the cost of releasing the lock is greater than the cost of performing the action (i.e., executing the stat(2) instruction at the updating node) and determines not to release the lock from the updating node. Instead, the updating node executes the stat(2) instruction on behalf of the requesting node. The resulting information, without having to flush the journal and release the lock, is then sent to the requesting node.

Another example of the DLM of the present invention relates to using a common file directory. In this example, multiple nodes of a cluster system allocate files into one common directory maintained on a single node (the "file node"). Although the contents of files may reside on other nodes, the directory structure of the common directory resides on the file node. This requires lock requests be sent to the file node whenever other nodes create a directory (or a file) within the common directory or run system calls (e.g., stat(2)) on the common directory. In a conventional cluster file system, this example causes the whole network to slow down when numerous lock requests are made to the file node, which occurs often.

In this example, the decision algorithm of embodiments of the present invention may determine not to release the lock but to maintain it on the file node because: i) the frequency of the lock-holding node (in this case the file node) using the storage resource (in this case the disk block storing the common directory) is high; ii) the amount of I/O needed to release the lock would be high because the journal for the whole block would need to be flushed; and iii) the cost of performing the requested action is low because creating a file (or a directory) or checking the status of an inode is a simple task.

The above-described example algorithms can be generalized as using a cost function. The cost function helps to make the decision about the relative merits of (a) releasing a lock to a requesting node or (b) performing a requested action. The cost function can be aimed at, for example, reducing the latency of a certain specific type of access by an application (e.g., a database management system). Alternatively, the cost function can be aimed at, for example, increasing overall throughput of the system (e.g., for batch processing—common in image processing and simulation environments) where the latency of a specific part of the workload is less important than finishing the whole job within a specific time. Regardless which cost function is used, the aim of the cost function is to define a function such that workload (i.e., tasks to be performed by the cluster) is executed in as short a time as possible.

The cost function may include the following components: i) the time taken from issuing a command to that command being executed on the hardware, $L_D$; and ii) the time taken to perform the I/O transfer, $T_D$. The cost function may also include components relating to costs incurred in communicating between nodes in the cluster: i) latency, $L_N$; ii) the actual transfer time, $T_N$; and iii) the network round trip time, $RTT=2T_N L_N$. The last equation assumes that communication times between all nodes in a cluster are substantially equal. Using the above-described components, among other components, a cost function can be formulated. The decision algorithm of the present invention minimizes the cost function, assuming the following: i) the processing at each node takes a negligible amount of time; and ii) $L_D \geq L_N$ and $T_D \geq T_N$. (These assumptions can be made because most disk arrays are slower than networks due to the physical constraints of the disks and the amount of time taken to set up and execute a SCSI command is usually greater than the time taken to send a packet on an Ethernet card.)

Improvements gained by implementing embodiments of the present invention can be quantified as follows:

Assume a mapping $f(R) \rightarrow N$, where N is a set of nodes, $N=\{0; 1; 2; \ldots n-1\}$, and R is a set of resources, $R=\{0; 1; 2; \ldots r-1\}$. In this notation, if a resource, r, maps onto a node, n, it means that the lock(s), so far as any may exist, on r are mastered by n. For instance, $f(2) \rightarrow 5$ means that the lock for resource 2 (e.g., block 2) is mastered by a lock-master running on Node 5.

Also assume the following: i) the mapping, $f(R) \rightarrow N$, is fixed, even though the mapping can change over time (e.g., the lock-master can migrate from one node to another); ii) all nodes have equal access to the storage subsystem (e.g., network disk farm 111) which will usually be a multiport RAID disk array (SCSI, fibrechannel, etc.)—this assumption makes the average cost of a disk access identical across all nodes; and iii) nodes have established connections between them.

1 Scenario 1

Assume that Node 0 masters a particular resource. If Node 1 sends a lock request and there is no conflict, the lock is granted and a reply sent to Node 0. These steps require only a single exchange of messages (i.e. one round trip time). Hence, the cost is $RTT=2L_N T_N$ plus the cost of disk I/O being performed by Node 0.

2 Scenario 2

Assume now that Node 2 holds a lock for the particular resource. This requires sending a request to Node 2 asking it to release the lock. In this case, the network I/O has increased by double to 2RTT. Also in order for Node 2 to release the lock, it may have to perform I/O to flush its cache and journal and finish any pending I/O. This is likely to be several blocks, "m" representing the number of blocks, worth of I/O giving a complete cost function of $2RTT+mT_D L_D$, plus the cost of the disk I/O by Node 0.

3 Scenario 3

Instead of Scenario 2 described-above, embodiments of the present invention cause Node 2 to perform a requested action as described above instead of releasing the lock. The cost function becomes 2RTT plus the cost of the disk I/O, which is now performed by Node 2 rather than Node 0. In this analysis, the cost of performing the action by Node 2 is assumed to be negligible.

4 Comparison

When the results in scenarios 2 and 3 are compared, the difference in the cost functions is $mT_D L_D$, e.g., the cost of flushing the cache and journal. This difference represents example administrative costs saved by embodiments of the present invention over a conventional DLM.

A DLM (and its components) of the present invention is preferably stored in a computer-readable medium. The term "computer-readable medium" as used herein means any medium that participates in providing instructions to the processor for execution. Such a medium may take many forms, including but not limited to, non-volatile media, volatile media, and transmission media. Common forms of computer-readable media include, for example: magnetic media such as a floppy disk, hard disk, or magnetic tape; optical media such as a CD-ROM or a DVD-ROM; memory chips or cartridges such as a RAM, a PROM, a EPROM, or a FLASH-EPROM; a carrier wave such as a digital signal configured to convey information; or any other medium from which a computer can read information such as instructions and data. Other examples of media include external storage resources that have become more common, such as USB pen-drives, USB- or Firewire-connected disk enclosures, Optical Fiber-connected Storage Area Network or Network-Attached Storage.

Embodiments of the present invention are described above in connection with a clustered network. An example of a clustered network is a Global File System (GFS), which is understood by those skilled in the art and is described at http://www.redhat.com/whitepapers/rha/gfs/GFS_INS0032US.pdf. However, embodiments of the present invention can be used in any network for which storage resources are shared without a dedicated server. An exemplary software system capable of being adapted to perform embodiments of the present invention includes Sistina LVM manufactured by Red Hat of Raleigh, N.C.

Parts of the present invention and corresponding detailed description are presented in terms of software or algorithms. Software includes symbolic representations of operations or steps stored in the form of data bits within a computer memory. An algorithm is a sequence of steps leading to a desired result (s). The steps are those requiring physical manipulations of physical quantities. Usually, though not necessarily, these quantities take the form of optical, electrical, or magnetic signals capable of being stored, transferred, combined, compared, and otherwise manipulated. Unless specifically stated otherwise, or as is apparent from the discussion, terms such as "processing" or "determining" or the like refer to the actions and processes of a computer system, or similar electronic computing device, that manipulates and transforms data represented as physical, electronic quantities within the computer system's memories into other data similarly represented as physical quantities within the computer system memories or registers or other such information storage, transmission or display devices.

The above description of embodiments the present invention represents only examples. Other examples include using embodiments of the present invention in any computing environment in which the integrity of data is important and a data locking mechanism can be used. For instance, in database management systems, the integrity of data is important and data locking mechanisms may be used. In such systems, various features of the present invention can be implemented.

What is claimed is:

1. A method of managing storage resources in a distributed file system, the method comprising:
   a) maintaining a first lock for a storage resource using a lock holder; and
   b) receiving, at a master node that manages said lock-holder, a lock request from a requesting node, wherein said lock request includes:
      b-i) a request to obtain a second lock for said storage resource, and
      b-ii) a request for a node to perform an action on said storage resource, wherein said lock holder resides on said node.

2. The method of claim 1, wherein the master node performs:
   granting said second lock to said requesting node in response to said lock request in accordance with a mutual exclusion requirement of said first and second locks.

3. The method of claim 1, further comprising:
   calculating a cost of releasing said first lock; and
   calculating a cost of performing said requested action.

4. The method of claim 3, further comprising:
   releasing said first lock if said cost of releasing said first lock is less than said cost of performing said requested action.

5. The method of claim 4, further comprising:
   maintaining said first lock if said cost of performing said requested action is less than said cost of releasing said first lock.

6. The method of claim 5, further comprising:
   performing said requested action without releasing said first lock.

7. The method of claim 1, further comprising:
   identifying a node that accesses said resource most frequently; and
   designating said identified node as said master node.

8. A system of clustered nodes that includes a file system for managing storage resources of the cluster, the system comprising:
   a lock-holding node on which a first lock for a storage resource resides;
   a lock-requesting node from which a lock request to release said lock is initiated; and
   a master-lock node configured to receive said lock request from said lock-requesting node, wherein said lock request includes:
      a) a request to obtain a second lock for said storage resource, and
      b) a request for said lock-holding node to perform an action on said storage resource.

9. The system of claim 8, wherein said lock-holding node is configured to initiate calculations for determining a cost of releasing said first lock and a cost of performing said requested action.

10. The system of claim 9, wherein said lock-holding node is further configured to cause said first lock to be released from said lock-holding node if said cost of releasing said first lock is less than said cost of performing said requested action.

11. The system of claim 9, wherein said lock-holding node is further configured to cause said first lock to be maintained on said lock-holding node if said cost of performing said requested action is less than said cost of releasing said first lock.

12. The system of claim 8, wherein said master-lock node is configured to initiate calculations for determining a cost of releasing said first lock and a cost of performing said requested action.

13. The system of claim 12, wherein said master-lock node is further configured to cause said first lock to be released from said lock-holding node if said cost of releasing said first lock is less than said cost of performing said requested action.

14. The system of claim 12, wherein said master-lock node is further configured to cause said first lock to be maintained on said lock-holding node if said cost of performing said requested action is less than said cost of releasing said first lock.

15. The system of claim 9, further comprising a distributed lock manager configured to identify a node that accesses said resource most frequently and to designate said identified node as said master node.

16. The system of claim 9, wherein said lock-holding node is configured to perform said action without releasing said first lock.

17. A computer program product, residing on a computer-readable storage medium, the computer program product comprising computer instructions for configuring a computer to perform the acts of:
   a) maintaining a first lock for a storage resource using a lock-holder; and
   b) receiving, at a master node that controls said lock-holder, a lock request from a requesting node, wherein said lock request includes:
      b-i) a request to obtain a second lock for said storage resource, and
      b-ii) a request for a node to perform an action on said storage resource, wherein said lock holder resides on said node.

18. The storage medium of claim 17, further comprising instructions to configure said master node to:
   grant said second lock to said requesting node in response to said lock request in accordance with a mutual exclusion requirement of said first and second locks.

19. The storage medium of claim 17, further comprising instructions for performing the acts of:
   calculating an amount of input/output operations required to release said first lock;
   calculating a frequency of said lock-holding node using said storage resource; and
   calculating a cost of performing said requested action.

20. The storage medium of claim 19, further comprising instructions for performing the act of:
   releasing said first lock if said cost of releasing said first lock is lower than said cost of performing said requested action.

21. The storage medium of claim 19, further comprising instructions for performing the act of:
   maintaining said first lock if said cost of performing said requested action is lower than said cost of releasing said first lock.

* * * * *